US012596378B2

(12) United States Patent　　(10) Patent No.:　　US 12,596,378 B2

Guay et al.　　(45) Date of Patent:　　Apr. 7, 2026

(54) AUTONOMOUS CONTROL AND NAVIGATION OF UNMANNED VEHICLES

(71) Applicant: Stratotegic Inc., Belleville (CA)

(72) Inventors: Martin Guay, Kingston (CA); Telema Harry, Kingston (CA)

(73) Assignee: Stratotegic Inc., Kingston (CA)

( * ) Notice: Subject to any disclaimer, the term of this patent is extended or adjusted under 35 U.S.C. 154(b) by 0 days.

(21) Appl. No.: 18/522,504

(22) Filed: Nov. 29, 2023

(65) Prior Publication Data

US 2024/0176360 A1　　May 30, 2024

Related U.S. Application Data

(60) Provisional application No. 63/428,586, filed on Nov. 29, 2022.

(51) Int. Cl.
　　*G05D 1/00*　　(2024.01)
　　*B64U 10/30*　　(2023.01)
　　*B64U 101/00*　　(2023.01)

(52) U.S. Cl.
　　CPC ............. *G05D 1/042* (2013.01); *B64U 10/30* (2023.01); *B64U 2101/00* (2023.01); *B64U 2201/10* (2023.01)

(58) Field of Classification Search
　　CPC ........ G05D 1/042; G05D 1/611; G05D 1/644; G05D 1/48; G05D 2109/26; B64U 10/30; B64U 2101/00; B64U 2201/10
　　See application file for complete search history.

(56) References Cited

U.S. PATENT DOCUMENTS

| | | | |
|---|---|---|---|
| 9,864,380 B1 * | 1/2018 | Ryan .................... | G05D 1/0005 |
| 2012/0232721 A1 | 9/2012 | Engblom | |
| 2012/0318188 A1 * | 12/2012 | Hudson .................. | B63G 8/001 |
| | | | 114/333 |
| 2018/0292222 A1 | 10/2018 | Lin et al. | |
| 2020/0333751 A1 | 10/2020 | Salsbury et al. | |

(Continued)

OTHER PUBLICATIONS

International Search Report and Written Opinion for corresponding International Application No. PCT/CA2023/051593 filed on Nov. 29, 2023.

(Continued)

*Primary Examiner* — Dylan M Katz

(74) *Attorney, Agent, or Firm* — Stephen J. Scribner

(57)　　　　　ABSTRACT

A method and controller for autonomous control and station-keeping of an unmanned vehicle uses sensor data corresponding to at least geographical location and vertical position of the unmanned vehicle within a fluid environment and computes a gradient of the unmanned vehicle movement, uses the gradient to estimate a vertical profile of a feature of the fluid environment that affects the gradient of the unmanned vehicle, identifies a favourable position in the vertical profile where the feature of the fluid environment would transport the unmanned vehicle in a direction that minimizes a performance metric, and outputs a control signal based on the favourable position in the vertical profile. The control signal controls at least one actuator that causes the unmanned vehicle to ascend or descend to the favourable position in the vertical profile. The unmanned vehicle may be a high altitude platform (HAP).

28 Claims, 14 Drawing Sheets

(56) References Cited

U.S. PATENT DOCUMENTS

2021/0124352 A1* 4/2021 Candido .................. G06N 3/04
2021/0181703 A1* 6/2021 Perez .................... G05B 15/02

OTHER PUBLICATIONS

Zhuo. S., et al., "Source Seeking of Multi-UAV Based on Extremum Seeking Algorithm", 2017 17th International Conference on Control, Automation and Systems (ICCAS 2017), pp. 1062-1067.
Bellemare, M.G., et al., "Autonomous navigation of stratospheric balloons using reinforcement learning", Nature, vol. 588, No. 7836, pp. 77-82, (2020).
Guay, M., et al., "Dual mode extremum-seeking control via Lie-bracket averaging approximations", Proceedings of the American Control Conference, vol. 2018-June), pp. 2972-2977, (2018).

* cited by examiner

AUTONOMOUS CONTROL AND NAVIGATION OF UNMANNED VEHICLES

RELATED APPLICATION

This application claims the benefit of the filing date of Application No. 63/428,586, filed on Nov. 29, 2022, the contents of which are incorporated herein by reference in their entirety.

FIELD

This invention relates to unmanned vehicle control systems, and more particularly, to the autonomous control, navigation, and station-keeping of high-altitude unmanned vehicles such as balloon platforms.

BACKGROUND

An unmanned high-altitude platform (HAP) is a structure designed to carry a payload to the stratosphere for a period of time. Examples of HAPs include high-altitude balloon platforms (HABPs), super-pressure balloons, airships, etc. HAPs do not require engines to be operational. They are often underactuated and they rely on winds in the stratosphere for navigation as they float passively in the earth's stratosphere according to the prevailing wind direction at an altitude of 15 km to 50 km. One of the major challenges of HABP operation is navigation and station-keeping, that is the ability to maintain the balloon in a particular geographical area, as the dynamics depend on factors such as wind velocity and solar elevation, for which only sparse wind measurement is possible and forecast errors may be significant [1]. These factors are strongly nonlinear and vary with time, altitude, and geographical location. The complex dynamics make accurate mathematical modelling difficult. Consequently, approaches based on mathematical models can not provide an effective control and navigation system.

SUMMARY

According to one aspect of the invention there is provided a method for autonomous control and station-keeping of an unmanned vehicle in a fluid environment, comprising: using a processor to compute at least one control signal from sensor data corresponding to at least geographical location and vertical position of the unmanned vehicle within the fluid environment; wherein the processor computes the at least one control signal by computing a gradient of the unmanned vehicle movement, using the gradient to estimate a vertical profile of a feature of the fluid environment that affects the gradient of the unmanned vehicle, identifying a favourable position in the vertical profile where the feature of the fluid environment would transport the unmanned vehicle in a direction that minimizes a performance metric, and computes at least one control signal based on the favourable position in the vertical profile; sending the at least one control signal to the unmanned vehicle; wherein at least one control signal manipulates at least one actuator that causes the unmanned vehicle to ascend or descend to the favourable position in the vertical profile.

According to another aspect of the invention there is provided a controller for autonomous control, navigation, and station-keeping of an unmanned vehicle, comprising: a processor that receives sensor data corresponding to at least geographical location and vertical position of the unmanned vehicle in a fluid environment; wherein the processor computes at least one control signal from the at least geographical location and vertical position data; wherein the processor executes an algorithm that computes a gradient of a performance metric and uses the gradient to estimate a vertical profile of a feature of the fluid environment that affects the gradient of the performance metric, identifies a favourable position in the vertical profile where the feature of the fluid environment would transport the unmanned vehicle in a direction that minimizes a distance from the station, computes the at least one control signal based on the favourable position in the vertical profile, and outputs the at least one control signal to the unmanned vehicle; wherein the at least one control signal manipulates at least one actuator that causes the unmanned vehicle to ascend or descend to the favourable position in the vertical profile.

According to another aspect of the invention there is provided non-transitory computer readable storage media for use with a processor, comprising stored computer code containing instructions direct the processor to implement one or more processing steps of a controller for an unmanned vehicle, the one or more steps selected from: receiving sensor data corresponding to at least geographical location and vertical position of the unmanned vehicle in a fluid environment; computing at least one control signal from the at least geographical location and vertical position data, comprising: implementing an algorithm that computes a gradient of the unmanned vehicle movement, uses the gradient to estimate a vertical profile of a feature of the fluid environment that affects the gradient of the unmanned vehicle, identifies a favourable position in the vertical profile where the feature of the fluid environment would transport the unmanned vehicle in a direction that minimizes a performance metric, computes the at least one control signal based on the favourable position in the vertical profile, and outputs the at least one control signal to the unmanned vehicle; wherein the at least one control signal controls at least one actuator that causes the unmanned vehicle to ascend or descend to the favourable position in the vertical profile.

In some embodiments, the at least one actuator effects a change in a property of the unmanned vehicle in the fluid environment.

In some embodiments, the property of the unmanned vehicle is buoyancy.

In some embodiments, the fluid environment is air.

In some embodiments, the unmanned vehicle is a high altitude platform (HAP) or a high altitude balloon platform (HABP).

In some embodiments, the fluid environment is water.

In some embodiments, the processor implements an extremum seeking controller (ESC) algorithm to compute the at least one control signal.

In some embodiments, the ESC continuously seeks a favourable position within the vertical profile, wherein the ESC determines that the feature of the fluid environment at the favourable position will achieve station-keeping.

In some embodiments, the ESC seeks a favourable position within the vertical profile in response to a change in at least one variable, wherein the ESC determines that the feature of the fluid environment at the favourable position will achieve station-keeping.

In some embodiments, the performance metric is a distance metric and the ESC identifies a favourable position in the vertical profile that minimizes the distance metric.

In some embodiments, the performance metric is minimized by persistently exciting the ESC algorithm with a perturbation to estimate the performance metric gradient without having direct knowledge of its dynamics.

In some embodiments, an amplitude of the perturbation is minimized as the performance metric is minimized.

In some embodiments, the perturbation comprises a sinusoidal function.

Another aspect of the invention relates to autonomous control and station-keeping of an unmanned vehicle such as a HABP comprising using an algorithm to compute and minimize a distance performance metric between the station and the HABP location, wherein the algorithm seeks an altitude with a favourable wind profile that will transport the HABP to the station.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1A:
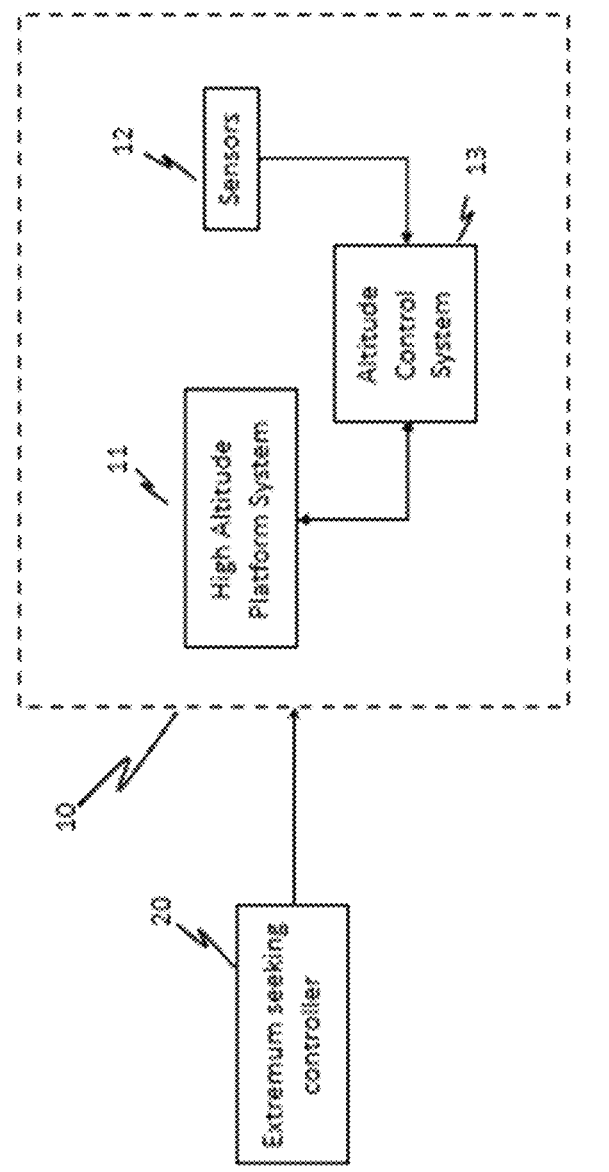
FIGS. 1A-1C are block diagrams showing components and arrangement of high-altitude platform control systems, according to embodiments.

Described herein are methods and control systems for autonomous control, navigation, and station-keeping of unmanned vehicles. Embodiments are described primarily with respect to unmanned airborne vehicles such as HAPs and HABPs, but as will be readily apparent to one of ordinary skill in the art, may be adapted for other airborne vehicles such as drones, all generally referred to herein as unmanned aerial vehicles (UAVs), as well as other applications including waterborne vehicles such as unmanned underwater vehicles (UUVs). Such unmanned vehicles are deployed in fluid environments, i.e., air or water columns, where they can ascend and descend in the air or water according to their buoyancy, and may be transported or steered passively by wind or currents in the air or water. Actuators such as valves, that may be actuated remotely, may be used to adjust the buoyancy of an unmanned vehicle, thereby providing the ability to control an unmanned vehicle's vertical position in the air or water, but generally cannot be used directly to steer the unmanned vehicle.

Regarding UAVs, atmospheric wind varies with time, altitude, and geographical location. If the wind profiles at different altitudes are known, a UAV such as a HABP may be placed at an altitude with a favourable wind profile that will transport the balloon in a desired direction or toward a selected geographical location. However, prior to this invention there was no way to accurately determine or estimate the wind profile at different altitudes. Control and navigation systems described herein overcome this constraint by using an actual measurement of a performance metric to estimate the time-varying wind profile with altitude and using this information to steer the UAV to a desired location by utilizing the onboard actuators for altitude control. For example, for a HABP this may include removing or adding an appropriate volume of gas (e.g., air) in the balloon to move it up and down, respectively, in the air column to place the HAPB at an altitude with a desired wind direction.

The following definitions apply to terms used throughout this description.

The term "station-keeping" refers to maintaining the position of a vehicle relative to a particular geographical location.

The term "processor" refers to any electronic device or apparatus that can receive structured input, process the structured input according to prescribed sequence or logical operations automatically, and produce a result of processed information as output. The term "processor" may refer generally to a computer, supercomputer, mini-computer, general-purpose computer, mainframe, work-station, server, microcomputer, laptop computer, interactive television, smartphone, tablet, as well as to a device such as a central processing unit (CPU), application specific hardware (e.g., an application specific integrated circuit (ASIC)), microcontroller unit (MCU), field programmable gate array (FPGA), programmable logic device (PLD), etc. The term "processor" may also refer to two or more computers connected over a network to receive structured input, process the input information, and produce output.

The term "software" refers to computer code or computer program or prescribed instructions (e.g., algorithm) that instruct a computer (i.e., processor) what to do or how to operate. Software may be stored on non-volatile computer readable media. Software may be implemented in an application (APP) and executed by a processor. Software may be written in any suitable programming language and compiled in a machine language code compatible with the processor.

The terms "control system" and "controller" refer to a device or a combination of devices that manages, commands, directs, or regulates the behaviour of other devices or systems. A control system or controller may be implemented in software, e.g., in one or more algorithms, hardware, or a combination thereof and may include one or more modules.

Embodiments described herein may be based on data-driven autonomous control systems for navigation and station-keeping of UAVs. Some embodiments may include an adaptive feedback control system referred to as extremum seeking control (ESC), implemented in one or more algorithm. Extremum seeking control is a type of adaptive control technique that steers a dynamical system with an unknown model to an optimum operating condition that would either minimize or maximize a performance metric, that is, by minimizing an unknown objective function. According to embodiments, the objective function or performance metric to be minimized may be a distance metric (e.g., a distance convex function) relating to the distance between the UAV and a station, as determined from UAV geographical location data, such as GPS data from an onboard GPS sensor. Unlike machine learning (ML), it does not rely on historical data, as it only requires direct measurement of the output function to compute the control input. ESC is suitable for the challenging problem of HABP control and navigation because it does not require an atmospheric wind model and historical data, making it straightforward to implement and less computationally expensive than other approaches such as ML.

Thus, some embodiments include solving the real-time unconstrained optimization problem of minimizing the distance performance metric, whose value is obtained via direct measurement of the HABP geographical location data, using an extremum seeking control algorithm. A goal of the extremum seeking control algorithm is to determine the altitude with a wind profile that can minimize the distance performance metric by estimating the gradient of the performance metric without having prior knowledge of the wind dynamics. This may be carried out by persistently exciting the algorithm with a perturbation (e.g., based on a cyclic function such as a sinusoidal function, square wave, etc., or a stochastic signal) which provides enough information to estimate the performance metric gradient without having direct knowledge of its dynamics.

In some embodiments the controller may include an extremum seeking control law based on a lie bracket approximation of the gradient flow of convex performance metrics that has a minimum point. Embodiments may include a dual extremum seeking controller based on integrator and proportional terms. One embodiment includes modification of the dual extremum seeking control algorithm based on lie bracket approximation [2], such that the perturbation amplitude vanishes as the system states tend towards a cost function extremum value. One embodiment includes the ability of the extremum seeking control law to adapt to the time-varying atmospheric conditions and continuously track the altitude with a favourable wind profile that will steer the HABP toward the station.

In one embodiment the ESC algorithm learns the prevailing atmospheric condition, estimates the gradient of the distance-based objective function (performance metric) by perturbing the system with some perturbation signal(s), and predicts the altitude with a wind profile that can achieve the desired control objective. The ESC algorithm may be designed such that the perturbation amplitude vanishes as the system states tend toward the performance metric extremum point. The extremum-seeking controller control action may be used as a setpoint for an onboard altitude control system. The function of the altitude control system is to drive the UAV to the required altitude by utilizing the onboard actuators from the UAV to effect upward or downward motion.

In other embodiments the controller implements event-triggered extremum seeking control (ETESC) wherein the algorithm executes a control action only when the atmospheric wind condition at a given altitude changes from favourable to unfavourable. According to such embodiments the time derivative of the objective function is estimated either continuously or at a predetermined fixed time interval using actual measurement of the cost function and the control action is implemented only when a predefined triggering condition is satisfied, such as, for example, a change in a parameter or performance metric (e.g., distance of a UAV from a base station). In some embodiments the change may be determined in relation to a threshold value.

According to embodiments, a data sampling rate of the controller parameters may be selected such that the controller dynamics are much faster than the atmospheric wind dynamics. For example, a selected sampling rate may be on the order of minutes. Examples include, but are not limited to, 1 to 10 minutes, 1 to 5 minutes, or 5 to 10 minutes.

According to some embodiments, a control and navigation system includes interconnection of an extremum seeking controller and an intelligent altitude controller. The altitude controller makes decisions based on a control signal received from the extremum seeking controller and sends control signals to the HAP that cause it to ascend or descend to the required altitude (with favourable wind profile) by displacing gas from the HAP or pumping gas into the HAP.

FIG. 1A is a block diagram showing typical components of a high altitude platform 10 controlled by an extremum seeking controller (ESC) 20 according to an embodiment. The ESC 20 controls an onboard altitude control system 13 that interfaces with the high altitude platform system (e.g., actuators) 11 and receives input from onboard sensors 12 (e.g., GPS). A function of the actuators of the high altitude platform system 11 is to change the altitude of the HAP from using signals from the ESC 20 as setpoints. The sensors 12 may be configured to sense and/or measure system variables such as one or more of wind speed, geographical location, altitude, temperature, flow rates, pressure, etc., as required to compute the controller inputs.

Figure 1B:
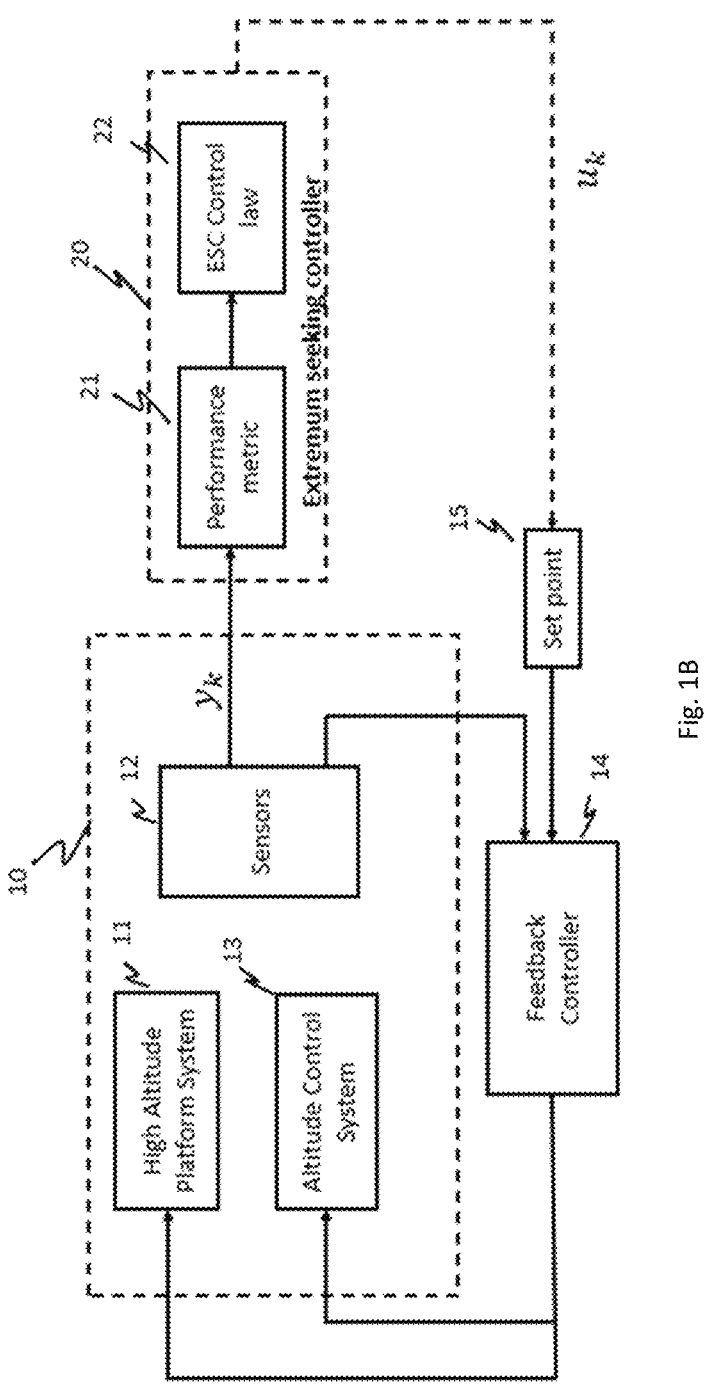

FIG. 1B is a block diagram showing components and signal configuration used for autonomous control and navigation of a high altitude platform according to another embodiment based on FIG. 1A. The ESC 20 estimates the performance metric 21 using ESC control law and outputs a signal $u_k$ used as a setpoint 15 for a feedback controller 14 which may be used to manipulate some system variables such as flow rate, altitude, etc. The onboard sensors 12 output a signal $y_k$ as input to the ESC 20.

Figure 1C:
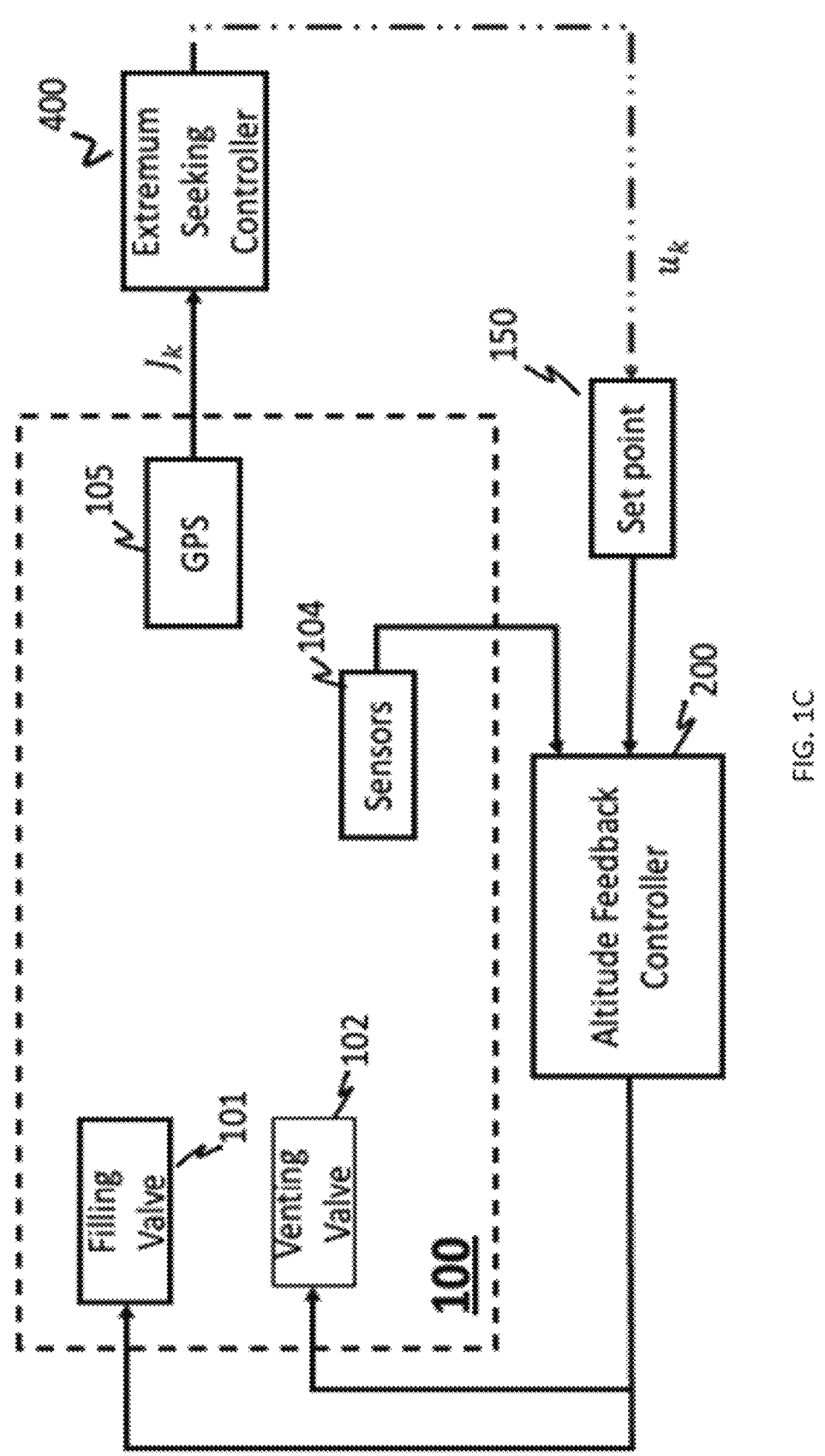

FIG. 1C is a block diagram of a control system for a HABP, according to one embodiment. According to this embodiment the system includes components disposed on the HABP 100, and components which may be disposed on the HABP or remotely (e.g., on a ground station and equipped with wireless communications to/from the HABP) including an extremum seeking controller 400 and an altitude feedback controller 200. The components disposed on the HABP include a filling valve 101, venting valve 102, sensors 104, and global positioning system (GPS) 105. The filling valve 101 and venting valve 102 are used to transfer gas in and out of the high-altitude balloon to change its buoyancy and effect downward or upward movement respectively. The gas may be a lifting gas or atmospheric air, or a combination thereof. The sensors 104 are configured to measure the system states such as altitude, pressure, temperature, and gas flow rates and the GPS 105 determines location data. The sensors 104 and GPS 105 transmit signals/data to the altitude feedback controller 200 and the extremum seeking controller 400, respectively, either by wired connections or wireless communications. The extremum seeking controller 400 calculates an altitude set point 150 that is used by the altitude feedback controller 200 together with sensor 104 information to determine whether the HABP should gain or loose altitude and, based on the determination, to generate the appropriate control signals for the filling valve 101 and the venting valve 102.

Figure 2A:
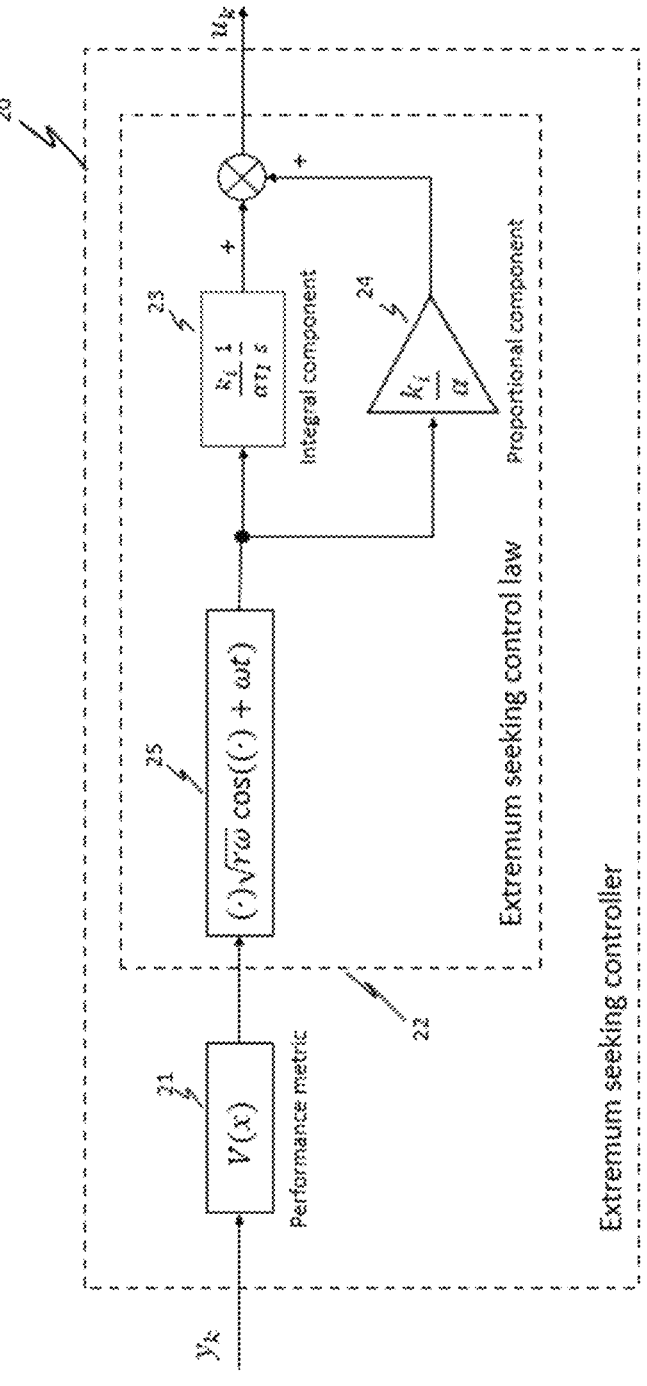
FIGS. 2A and 2B are block diagrams of an extremum seeking controller and an altitude controller, respectively, according to embodiments.

FIG. 2A is a block diagram showing components of an ESC according to an embodiment. The goal of the ESC is to implement the control action $u_k$ which will drive the performance metric 21 to its optimum value. This is achieved by persistently exciting the system by some perturbation signal 25 which provides enough information to estimate the performance metric gradient without having direct knowledge of its dynamics. The control law is designed such that the perturbation signal amplitude can be made to either vanish or not vanish at the performance metric optimal point. This embodiment includes a dual-mode extremum seeking control including an integral component 23 and proportional component 24 which is designed to remove input bias. In one embodiment the control law equation is given by equations (1) and (2) below.

Figure 2B:
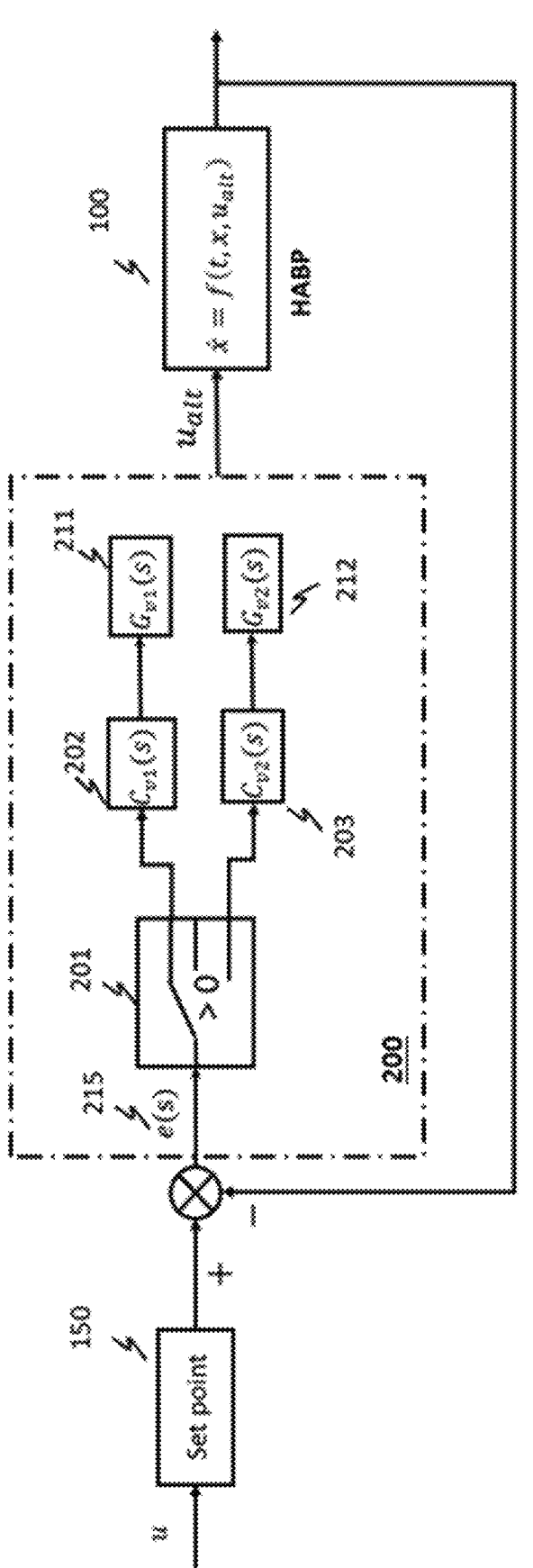

FIG. 2B is a block diagram showing details of the altitude feedback controller 200, according to one embodiment. The controller includes an intelligent switch system 201 that decides if a downward or upward movement of the HABP is required based on the value of an error signal 215. The error signal 215 is determined based on a comparison of the altitude set point 150 and the actual altitude of the HABP 100 as determined by one or more onboard sensors 104, e.g., an altitude sensor. Control law 202 is implemented and a control signal 211 is sent to the venting valve 102 (FIG. 1C) which is opened for venting of atmospheric air for an upward motion. Otherwise control law 203 is implemented, and a control signal 212 is sent to the filling valve 101 (FIG. 1C) which is opened for filling of atmospheric air in the balloon inner chamber for a downward motion. Feedback from the onboard sensors of the HABP and the set point are continuously compared (e.g., according to a selected sampling rate) to determine the appropriate control signals 211 and 212, and consequently the status (opened or closed) of the filling valve 101 and the venting valve 102. Accordingly, the altitude feedback controller 200 ensures that the high-altitude balloon platform 100 can quickly attain the new altitude setpoint 150.

Figure 3:
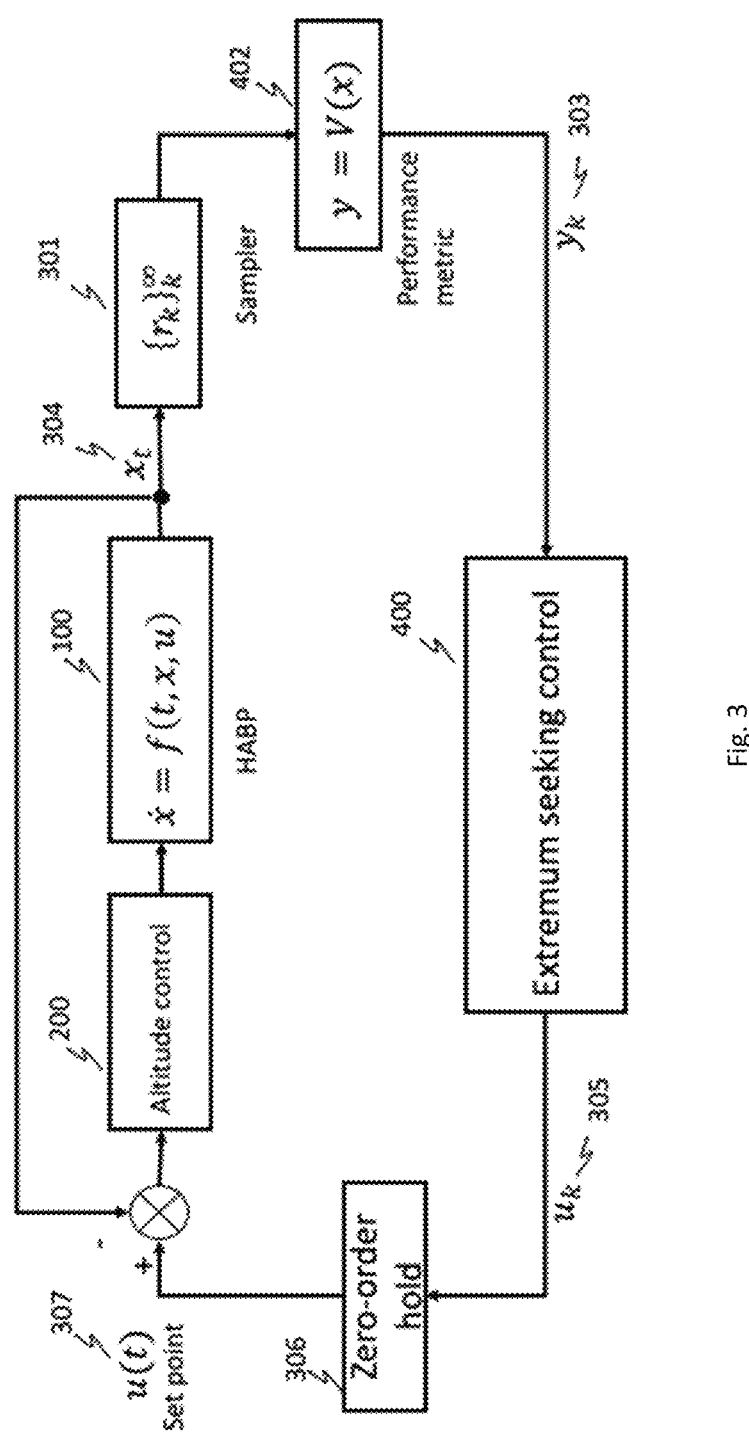
FIG. 3 is a block diagram of a high-altitude balloon platform control system, according to one embodiment.

FIG. 3 is a block diagram showing an implementation of a HABP control system according to one embodiment. The performance metric 303 is used by the extremum seeking controller 400 to compute a control signal 305. The control signal 305 is converted into a continuous signal (i.e., the set point) 307 by a zero-order hold device 306, which is input to the comparator. Sampling the system at a periodic time interval (i.e., sampling rate), e.g., 5 to 10 minutes, may account for ascent or descend time to the new altitude corresponding to the set point.

Figure 4:
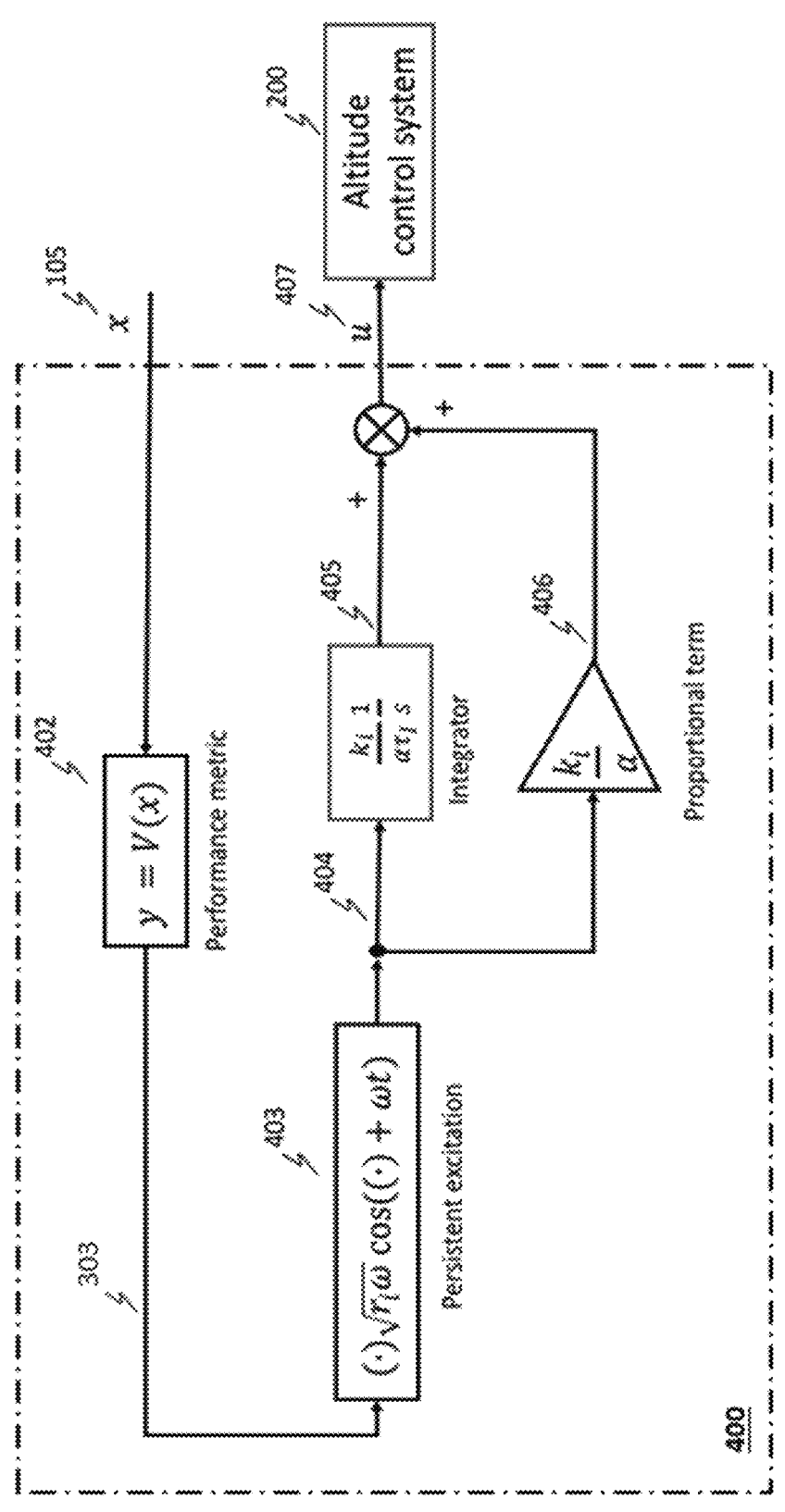
FIG. 4 is a block diagram showing an internal mechanism and configuration of an extremum seeking controller, according to one embodiment.

FIG. 4 is a block diagram of the extremum seeking controller 400 according to one embodiment. The extremum seeking controller 400 implements a real-time optimizer that operates to minimize the performance metric 303 or to drive the performance metric to zero. The performance metric is computed at 402 using the high-altitude balloon platform's geographical location data obtained from the GPS system 105. The system is persistently excited by a perturbation which may be, for example, a sinusoidal function 403 which provides enough information to estimate the performance metric gradient (e.g., first order derivative of the performance metric with respect to the actuator variables) without having direct knowledge of its dynamics. For example, this may involve perturbing the system with 1 to 10 sinusoidal cycles or other perturbations. In this embodiment, the amplitude of the sinusoidal perturbation decreases as the magnitude of the performance metric 303 decreases, and vanishes at the optimal control input. The persistently excited signal 404 is passed through a dual model extremum seeking control system, integrator 405 and a proportional term 406 to compute the control input 407 to the altitude controller 200. The dual mode approach removes input bias, making it suitable for this type of problem.

Control Law

In some embodiments the control law equation is given by:

$$\dot{\hat{u}} = \frac{K_i}{\alpha \tau} V(x) \sqrt{r_i \omega} \cos\left(\alpha^2 V(x) + r_i \omega t\right) \tag{1}$$

$$u = \frac{K_i}{\alpha} V(x) \sqrt{r_i \omega} \cos\left(\alpha^2 V(x) + r_i \omega t\right) + \hat{u} \tag{2}$$

Where $k_i$, $\alpha$, and $\tau_l$ are tuning parameters and they depend on the system characteristics. The performance metric equation is given by:

$$V(x) = (x_{lat} - d_{lat})^2 + (x_{lon} - d_{lon})^2 \tag{3}$$

Where $x_{lat}$ and $x_{lon}$ are the latitude and longitude data, respectively, obtained from the global positioning system 105, and $d_{lat}$ and $d_{lon}$ is the location of the station. In other embodiments the performance function may be formulated to include other parameters such as boundary conditions, penalty, etc.

Figure 5A:
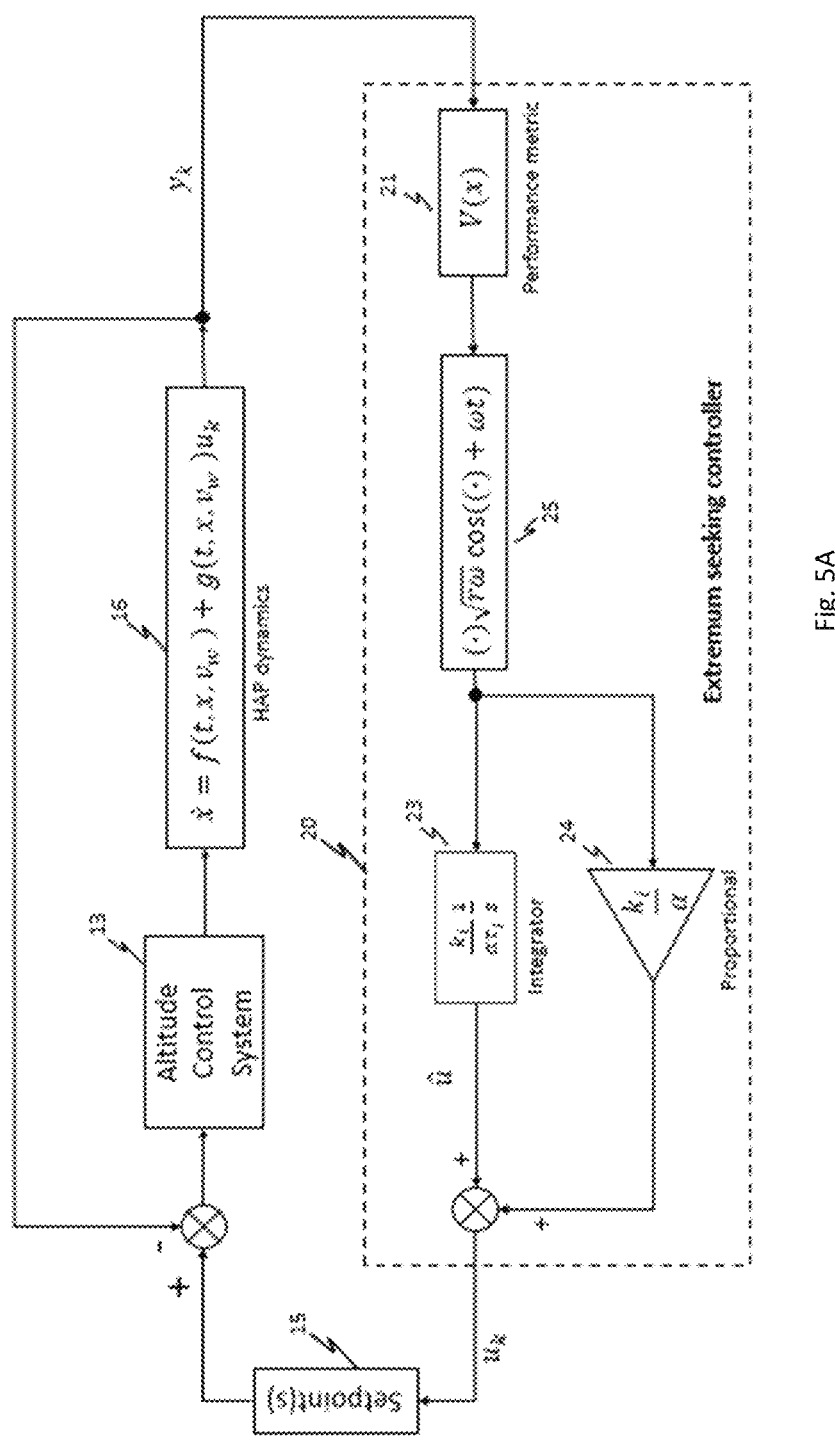
FIGS. 5A and 5B are detailed block diagrams showing implementations of a HAP control systems, according to embodiments.

FIG. 5A is a detailed block diagram showing an implementation of a HAP control system, according to one embodiment. This embodiment includes features described above with reference to FIGS. 1A, 1B, and 2A, and shows an example of a HAP dynamics component 16 that determines the signal $y_k$ as input to the ESC 20.

Figure 5B:
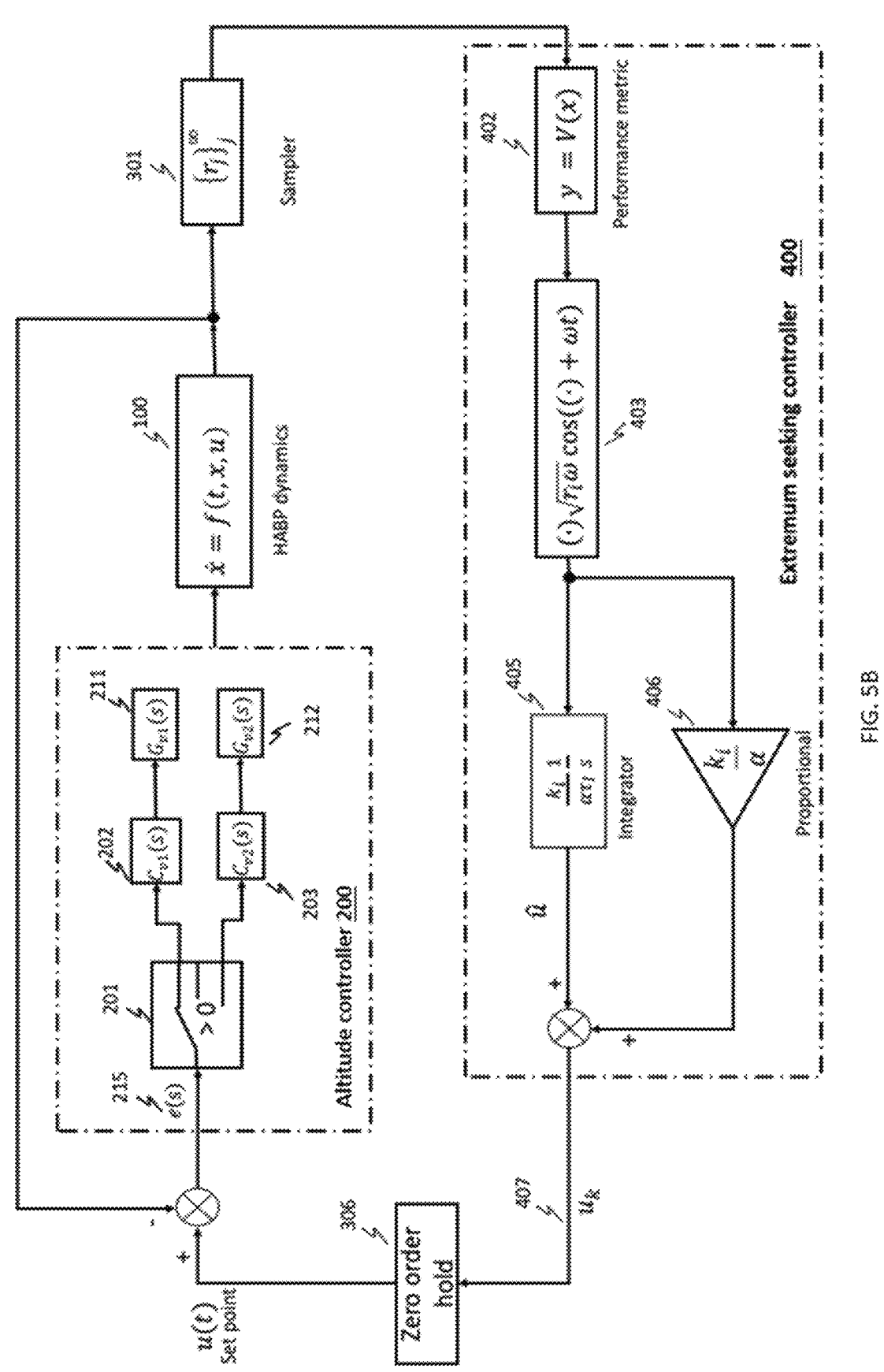

FIG. 5B is a detailed block diagram showing an implementation of a HABP control system, according to one embodiment. This embodiment includes features described above with reference to FIGS. 1C, 2B, 3, and 4.

Figure 6:
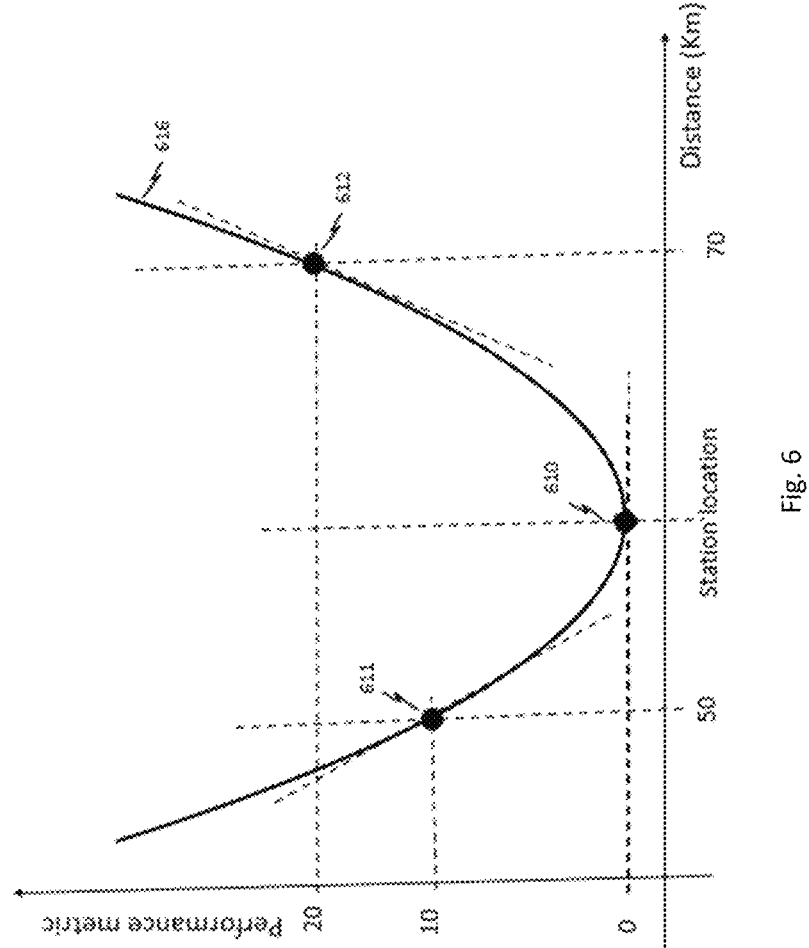
FIG. 6 is a graph depicting an extremum seeking control operation, according to an embodiment.

FIG. 6 is a graph depicting the performance metric convex function 616, according to an embodiment. In this embodiment the performance metric is a function of the geographical location of the HAP and station location. The ESC estimates the gradients at points 611 and 612 and provides the corresponding inputs that will drive the performance metric to zero. In this embodiment, the HAP is in the vicinity of station 610 when the performance metric is equal to zero. A typical performance metric equation is given by $$V(x) = (D_{HAP} - R_s)^2 \tag{4}$$

where $D_{HAP}$ is the distance between the HAP and the station and $R_s$ is the radius if a circular area of operation is desired. $R_s$ can easily be modified to account for other areas of interest.

Figure 7:
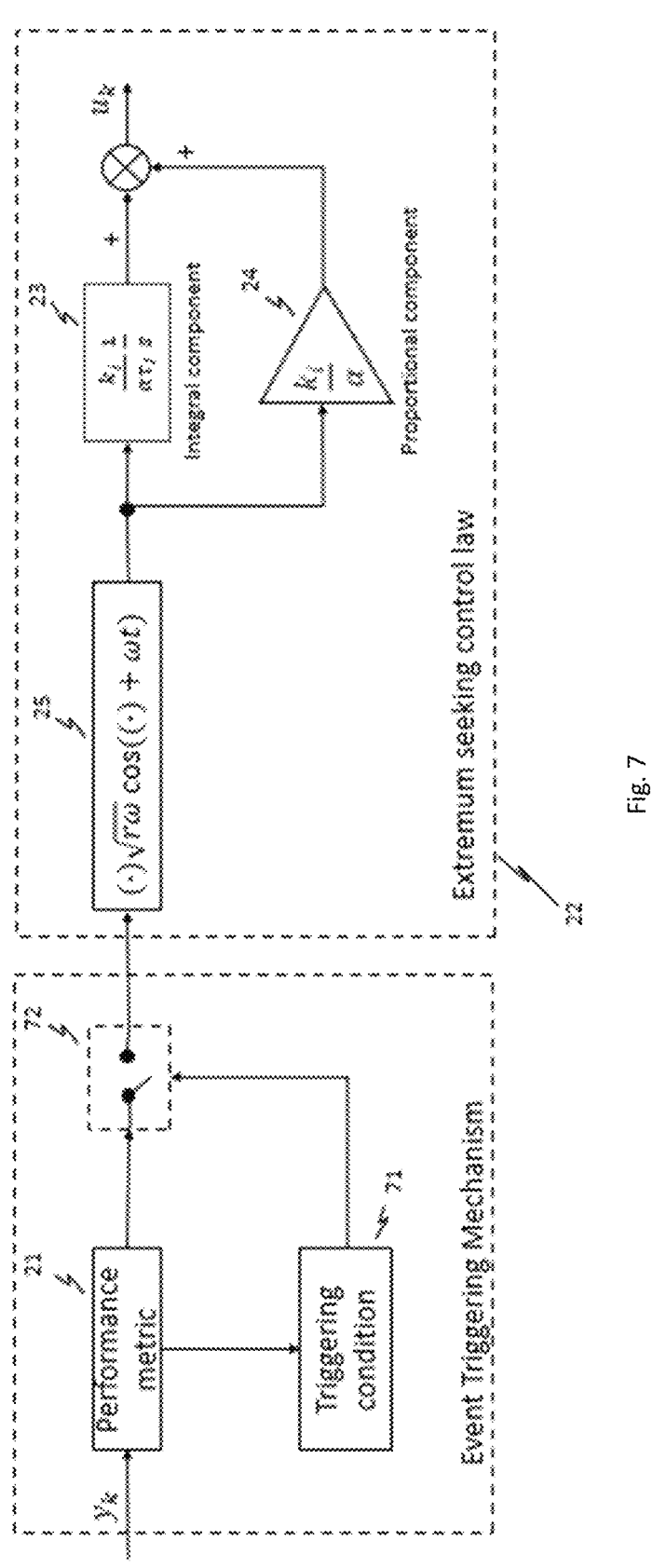
FIG. 7 is a block diagram of an event triggered extremum seeking controller and control signal configuration, according to one embodiment.

FIG. 7 is a block diagram of an event-triggered extremum seeking controller according to another embodiment. A difference between this embodiment and the control algorithm depicted in FIG. 2A is that the extremum seeking control action $u_k$ is implemented only when some predefined triggering condition 71 is met. When the triggering condition is satisfied, a signal is sent to switch 72 allowing the transmission of a signal to the extremum seeking control law block 22. The objective is to save energy and implement control action only when there is a change in a parameter, such as atmospheric wind conditions, that would steer the HAP away from the station. A decrease in the performance metric indicates that the HAP is moving towards the station while an increase in the performance metric indicates that the HAP is moving away from the station. In this embodiment the rate of change of the performance metric is used as the triggering condition.

The invention is further described by way of the following non-limiting Example.

EXAMPLE

The effectiveness of using extremum seeking control for autonomous control and station-keeping of a high-altitude balloon platform was demonstrated for an embodiment based on FIG. 5B in a simulation exercise. In the simulation a high-altitude balloon platform was launched from Timmins, Canada (longitude: 278.669°, latitude: 48.476°) and the goal was to maintain the HABP around a station (i.e., station-keeping) located at longitude: 278°, latitude: 48°, about 72.6 km from Timmins. The simulation ran for 32 hours and was performed using actual wind data (i.e., historical minute-by-minute wind data) obtained from the National Oceanic and Atmospheric Administration (NOAA) Operational Model Archive and Distribution System (NOMADS) (https://nomads.ncep.noaa.gov/).

Figures 8A, 8B:
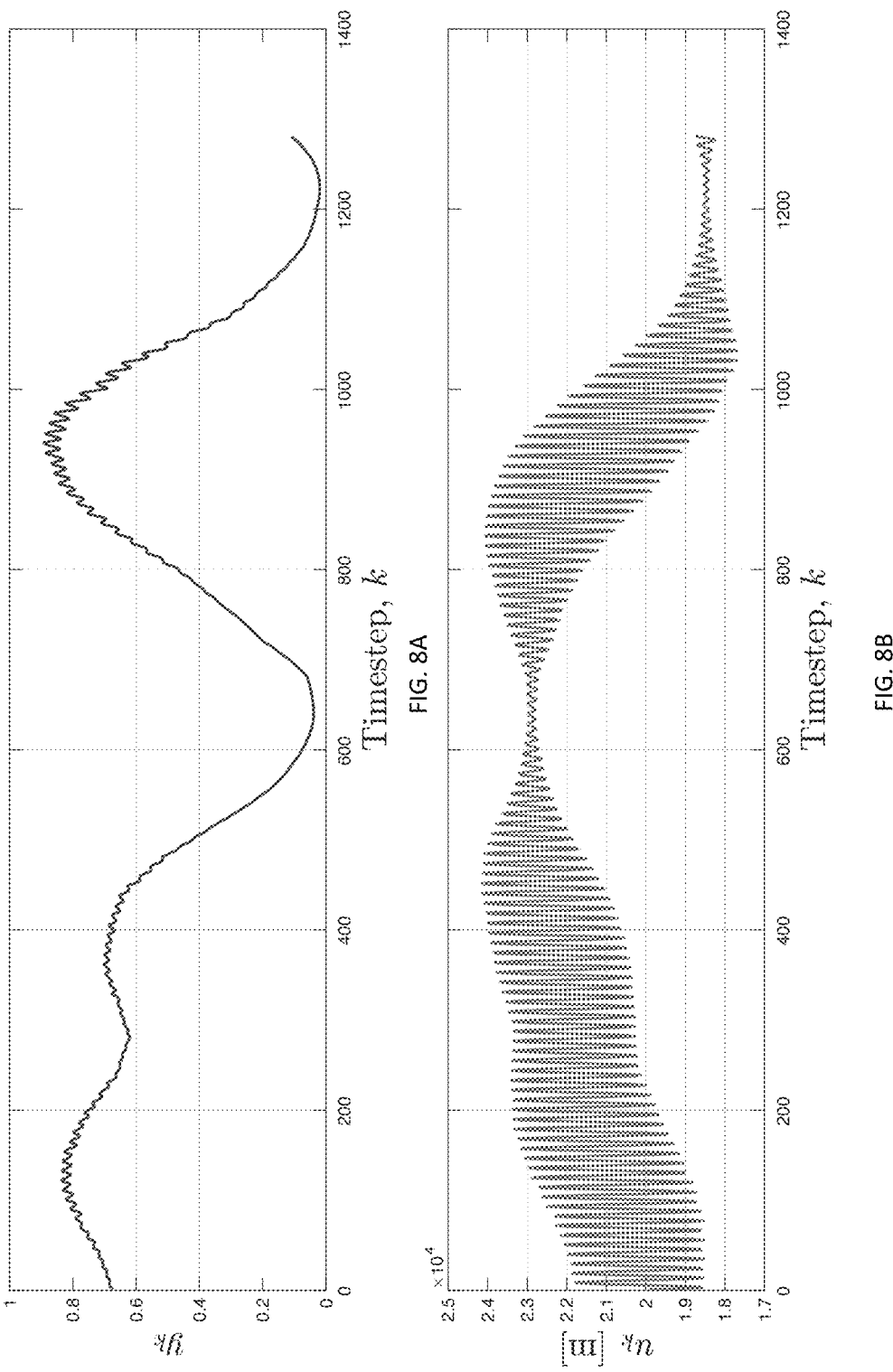
FIGS. 8A and 8B are plots of simulation results of a HABP control system, wherein FIG. 8A (upper panel) shows the performance metric $y_k$ to be minimized and FIG. 8B (lower panel) shows the corresponding control input $u_k$ and each time step k, according to one embodiment.
Figure 9:
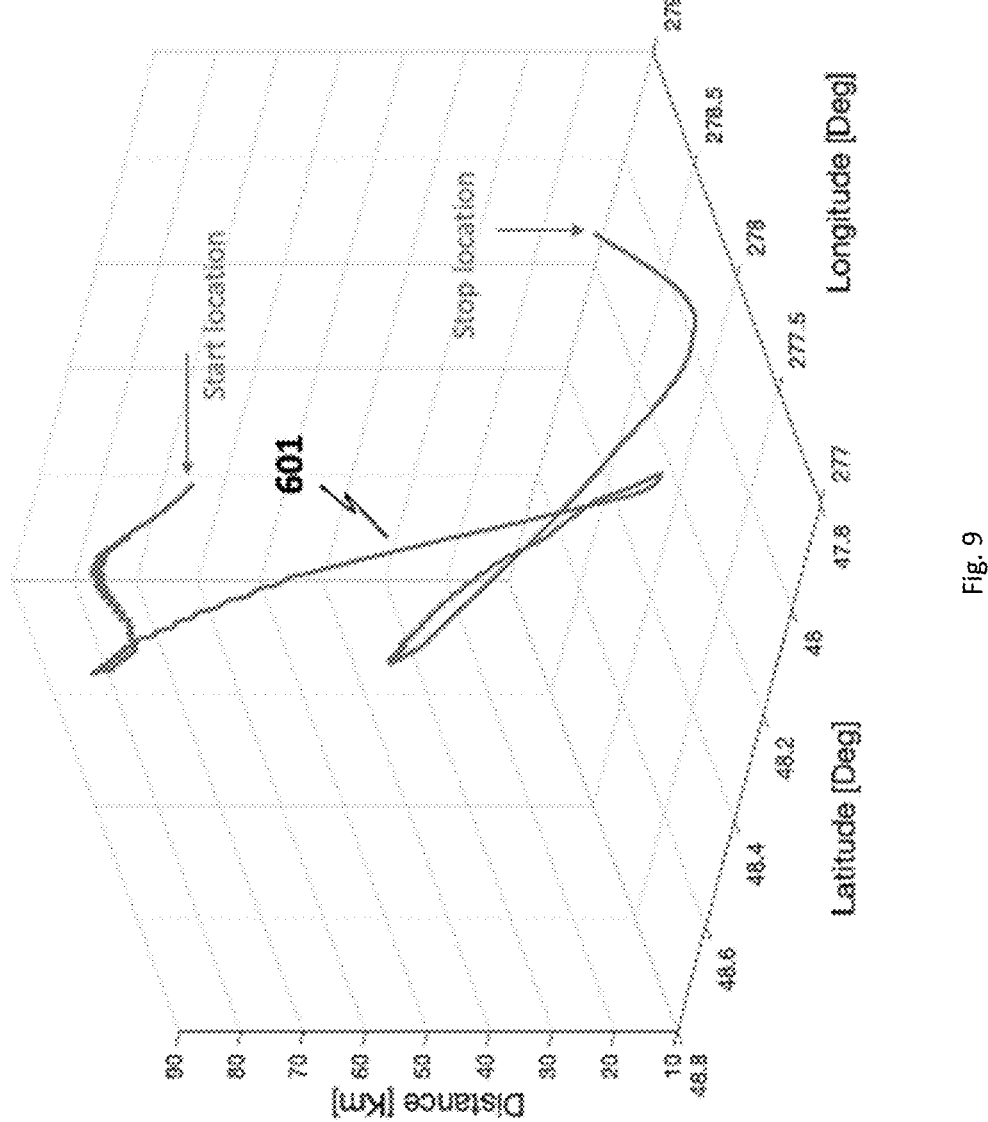
FIG. 9 is a graph showing the HABP trajectory obtained in the simulation of FIGS. 8A and 8B, according to one embodiment.
Figure 10:
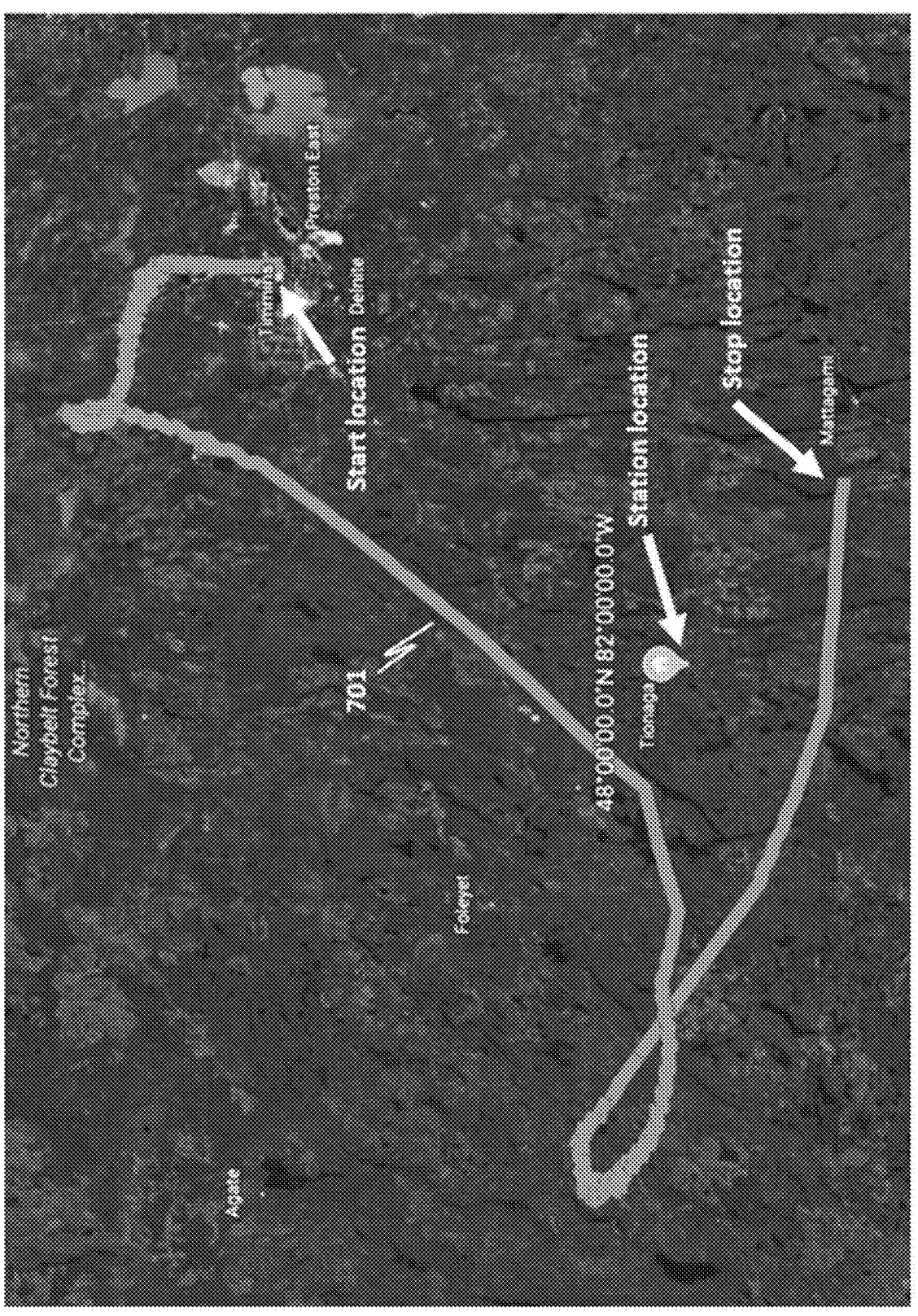
FIG. 10 is an aerial photograph of the location for the simulation of FIGS. 8A and 8B on which the trajectory of the HABP obtained from simulation is mapped, according to one embodiment.

FIGS. 8A and 8B show the simulation results, wherein FIG. 8A (upper panel) is a plot of the performance metric $y_k$ and FIG. 8B (lower panel) is a plot of the control input $u_k$, both as a function of the timestep k (1 minute). The performance metric $y_k$ is representative of the distance on the HABP from the station. The results show that the algorithm continuously learns the prevailing atmospheric wind profile using a gradient descent methodology (e.g., a nonlinear optimization based on a standard first order unconstrained optimization strategy) and adjusts the control input $u_k$ to estimate the altitude with a favourable wind condition. A favourable wind condition causes the HABP to be transported in a direction that minimizes the performance metric $y_k$. FIGS. 9 and 10 show a plot and a map, respectively, of the distance covered and trajectory of the high-altitude balloon platform during the simulation. It can be seen that the HABP was within 27 km of the station at the end of the simulation.

All cited publications are incorporated herein by reference in their entirety.

EQUIVALENTS

It will be appreciated that modifications may be made to the embodiments described herein without departing from the scope of the invention. Accordingly, the invention should not be limited by the specific embodiments set forth, but should be given the broadest interpretation consistent with the teachings of the description as a whole.

REFERENCES

[1] M. G. Bellemare et al., "Autonomous navigation of stratospheric balloons using reinforcement learning", Nature, vol. 588, no. 7836, pp. 77-82, 2020, doi: 10.1038/s41586-020-2939-8.

[2] M. Guay and K. T. Atta, "Dual mode extremum-seeking control via Lie-bracket averaging approximations", Proceedings of the American Control Conference, vol. 2018-June, pp. 2972-2977, August 2018, doi: 10.23919/ACC.2018.8430884.

The invention claimed is:

1. A method for autonomous control and station-keeping of an unmanned vehicle in a fluid environment, comprising:

using a processor to compute at least one control signal only from sensor data obtained in real time corresponding to at least geographical location and vertical position of the unmanned vehicle within the fluid environment;

wherein the processor uses the sensor data to compute an instantaneous directional gradient of the unmanned vehicle movement, uses the gradient to estimate a vertical profile of a feature of the fluid environment that affects the gradient of the unmanned vehicle, implements a real-time optimizer that identifies a favourable position in the vertical profile where the feature of the fluid environment would transport the unmanned vehicle in a direction that minimizes a performance metric, and computes the at least one control signal based on the favourable position in the vertical profile;

sending the at least one control signal to the unmanned vehicle;

wherein the at least one control signal manipulates at least one actuator that causes the unmanned vehicle to ascend or descend to the favourable position in the vertical profile.

2. The method of claim 1, wherein the fluid environment is air.

3. The method of claim 2, wherein the unmanned vehicle is a high altitude platform (HAP).

4. The method of claim 1, wherein the fluid environment is water.

5. The method of claim 1, wherein the processor implements an extremum seeking controller (ESC) algorithm to compute the at least one control signal.

6. The method of claim 5, wherein the ESC continuously seeks a favourable position within the vertical profile, wherein the ESC determines that the feature of the fluid environment at the favourable position will achieve station-keeping.

7. The method of claim 5, wherein the ESC seeks a favourable position within the vertical profile in response to a change in at least one variable, wherein the ESC determines that the feature of the fluid environment at the favourable position will achieve station-keeping.

8. The method of claim 5, wherein the ESC calculates the performance metric and identifies a favourable position in the vertical profile that minimizes the performance metric.

9. The method of claim 8, wherein the performance metric is distance of the unmanned vehicle from a desired location.

10. The method of claim 8, comprising minimizing the performance metric by persistently exciting the ESC algorithm with a perturbation to provide a result, and using the result to estimate the performance metric gradient without having direct knowledge of its dynamics.

11. The method of claim 10, wherein an amplitude of the perturbation is minimized at the favourable position within the vertical profile.

12. A controller for autonomous control, navigation, and station-keeping of an unmanned vehicle, comprising:

a processor that computes at least one control signal only from sensor data obtained in real time corresponding to at least geographical location and vertical position of the unmanned vehicle within the fluid environment;

wherein the processor executes an algorithm that uses the sensor data to compute an instantaneous directional gradient of the unmanned vehicle movement, uses the gradient to estimate a vertical profile of a feature of the fluid environment that affects the gradient of the unmanned vehicle, implements a real-time optimizer that identifies a favourable position in the vertical profile where the feature of the fluid environment would transport the unmanned vehicle in a direction that minimizes a performance metric, computes the at least one control signal based on the favourable position in the vertical profile, and outputs the at least one control signal to the unmanned vehicle;

wherein the at least one control signal manipulates at least one actuator that causes the unmanned vehicle to ascend or descend to the favourable position in the vertical profile.

13. The controller of claim 12, wherein the fluid environment is air.

14. The controller of claim 13, wherein the unmanned vehicle is a high altitude platform (HAP).

15. The controller of claim 12, wherein the fluid environment is water.

16. The controller of claim 12, wherein the processor implements an extremum seeking controller (ESC) algorithm to compute the at least one control signal.

17. The controller of claim 16, wherein the ESC continuously seeks a favourable position within the vertical profile, wherein the ESC determines that the feature of the fluid environment at the favourable position will achieve station-keeping.

18. The controller of claim 16, wherein the ESC seeks a favourable position within the vertical profile in response to a change in at least one variable, wherein the ESC determines that the feature of the fluid environment at the favourable position will achieve station-keeping.

19. The controller of claim 16, wherein the ESC calculates the performance metric and identifies a favourable position in the vertical profile that minimizes the performance metric.

20. The controller of claim 19, wherein the processor minimizes the performance metric by persistently exciting the ESC algorithm with a perturbation to produce a result, and uses the result to estimate the performance metric gradient without having direct knowledge of its dynamics.

21. The controller of claim 20, wherein an amplitude of the perturbation is minimized at the favourable position within the vertical profile.

22. Non-transitory computer readable storage media for use with a processor, comprising stored computer code containing instructions direct the processor to implement one or more processing steps of a controller for an unmanned vehicle, the one or more steps selected from:

computing at least one control signal only from sensor data obtained in real time corresponding to at least geographical location and vertical position of the unmanned vehicle within the fluid environment, comprising:

implementing an algorithm that uses the sensor data to compute an instantaneous directional gradient of the unmanned vehicle movement, uses the gradient to estimate a vertical profile of a feature of the fluid environment that affects the gradient of the unmanned vehicle, implements a real-time optimizer that identifies a favourable position in the vertical profile where the feature of the fluid environment would transport the unmanned vehicle in a direction that minimizes a performance metric, computes the at least one control signal based on the favourable position in the vertical profile, and outputs the at least one control signal to the unmanned vehicle;

wherein the at least one control signal manipulates at least one actuator that causes the unmanned vehicle to ascend or descend to the favourable position in the vertical profile.

23. The non-transitory computer readable storage media of claim 22, wherein the processor implements an extremum seeking controller (ESC) algorithm to compute the at least one control signal.

24. The non-transitory computer readable storage media of claim 23, wherein the ESC continuously seeks a favourable position within the vertical profile, wherein the ESC determines that the feature of the fluid environment at the favourable position will achieve station-keeping.

25. The non-transitory computer readable storage media of claim 23, wherein the ESC seeks a favourable position within the vertical profile in response to a change in at least one variable, wherein the ESC determines that the feature of the fluid environment at the favourable position will achieve station-keeping.

26. The non-transitory computer readable storage media of claim 23, wherein the ESC calculates a performance metric and identifies a favourable position in the vertical profile that minimizes the performance metric.

27. The non-transitory computer readable storage media of claim 26, comprising minimizing the performance metric by persistently exciting the ESC algorithm with a perturbation to provide a result, and using the result to estimate the performance metric gradient without having direct knowledge of its dynamics.

28. The non-transitory computer readable storage media of claim 27, wherein an amplitude of the perturbation is minimized at the favourable position within the vertical profile.

* * * * *